United States Patent Office 3,290,390
Patented Dec. 6, 1966

3,290,390
PRODUCTION OF BISPHENOL FROM RESINOUS BY-PRODUCTS
Walter H. Prahl, Buffalo, and Sol J. Lederman and Ellis I. Lichtblau, Kenmore, N.Y., assignors to Hooker Chemical Corporation, Niagara Falls, N.Y., a corporation of New York
No Drawing. Filed Dec. 31, 1962, Ser. No. 248,278
The portion of the term of the patent subsequent to Jan. 15, 1980, has been disclaimed
6 Claims. (Cl. 260—619)

This invention relates to the production of 2,2-(4,4′-dihydroxydiphenyl)propane, also known as bisphenol-A, and more specifically to the production of bisphenol-A of a high degree of purity This is a continuation-in-part of our parent application for Letters Patent Serial No. 791,281, filed February 5, 1959, now U.S. Patent 3,073,868, issued January 15, 1963, and of our co-pending application Serial No. 176,923, filed March 2, 1962, now U.S. Patent 3,207,759, and of our Serial No. 220,617, filed August 31, 1962, now U.S. Patent 3,219,549.

Bisphenol-A is conventionally produced by the condensation of two moles of phenol with one mole of acetone in the presence of an acidic substance. It can be prepared, however, by other methods also, such as, for instance, by the reaction of phenol with substances containing double or triple bonds, such as propadiene (allene), propyne (methylacetylene), and mixtures thereof, under the influence of a Friedel-Crafts or Lewis acid catalyst such as boron trifluoride.

In the production of 2,2-(4,4′-dihydroxydiphenyl)propane, a number of by-product impurities are formed. Such impurities may comprise for instance, higher condensation products, containing, for instance, three phenolic nuclei to two radicals of the ketone, and still higher condensation products in form of resins and tars, and condensation products having a composition similar to, or identical with, that of the bisphenol-A, but having different properties, (possibly isomers, hemiacetals or similar compounds) and condensation products of the ketone with itself, and high molecular colored substances and others. For the production of bisphenol-A numerous processes are known which differ, among other ways, in the manner in which they deal with these impurities.

Some processes do not attempt to separate these impurities at all. Their disadvantage is that all or most of the contaminants remain in the product, resulting in a bisphenol which contains as much as 20 mol percent impurities, as indicated by the freezing point, and a quantity of colored substances causing a pronounced yellow or brownish color of the product.

In other processes advantage is taken of the fact that in the condensation, a stage is reached when the desired product is present as a crystalline phase, normally as a slurry in mother liquor. Such processes separate these crystals from the mother liquor, thereby effecting a considerable degree of purification, especially if such crystals are washed with solvents, such as water, phenol, etc. The disadvantage of such processes is their complication. By separating the crystals from the mother liquor, the process flow is split into two parts, each of which requires its own separate further treatment. The impurities, although essentially removed from the crystals, accumulate in the mother liquor and create the problem of removing them from it, before the valuable ingredients of the mother liquor can be recovered.

It has also been suggested to purify the product by crystallization in the form of its addition product with phenol, but again, part of the product is left in the mother liquor of the process, part is left in the mother liquor of the recrystallization process and the valuable ingredients of both process parts have to be recovered, thereby making the process complicated.

It would appear that a distillation of the crude product should result, as it does in many other cases, in a pure product, and this method of purification has been suggested. In attempting to purify the product by distillation, the low boiling contaminants, such as phenol, isopropyl phenol, isopropenyl phenol, and the like, are removed as well as high boiling substances, such as the higher condensation products, colored materials, traces of metal, and so forth may be separated from the bisphenol-A. Such distillation can be achieved by observing a number of necessary precautions, such as: insuring the complete absence of acidic or alkaline substances and other materials, such as certain salts, which could act as catalysts in rapidly decomposing bisphenol to resinous matter; employing a very good vacuum; employing the shortest possible holding time in the evaporator; and preferably using a thin-surface evaporator. In spite of all these precautions, however, a partial decomposition of the bisphenol may result. The distillate of even very carefully distilled bisphenol may contain certain small quantities of a yellow resinous substance, which has a slightly lower boiling point than bisphenol and causes a depressed freezing point and an unsatisfactory color.

The above mentioned purification processes have, in addition to the many individual shortcomings, the one common disadvantage that the removal of the impurities lowers the yield of product considerably, as compared to the crude commercial product which contains up to 20 percent impurities.

In carrying out the manufacture according to our copending applications Serial No. 791,281, Serial No. 176,923 and Serial No. 220,617, the impurities or by-products are removed by processes which comprise distillation steps, including the distillation of the 2,2(4,4′dihydroxydiphenyl)propane itself, in which the impurities having substantially lower and substantially higher boiling points than 2,2-(4,4′dihydroxydiphenyl)propane are essentially separated from the latter by distillation. A proportion of the impurities, however, boils sufficiently close to that of 2,2-(4,4′dihydroxydiphenyl)propane to make a complete separation by distillation often very difficult or impractical. It appears that the three main by-product representatives of this portion are (1) 2,2-(2,4′-dihydroxydiphenyl)propane, also referred to herein as the "o,p′-isomer":

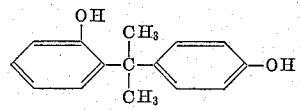

(2) 2,2,4-trimethyl-4-p-hydroxyphenyl chroman, also called herein the "co-dimer":

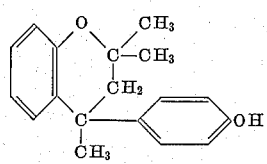

and (3) 2,2-(2,2′-dihydroxydiphenyl)propane, also referred to herein as the "o,o′-isomer":

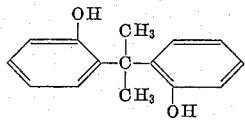

In our above-mentioned copending applications, it has been shown how these impurities can be separated from the 2,2-(4,4′-dihydroxydiphenyl)propane and how they are recovered as a by-product mixture having a resinous appearance. Essentially, the impurities are separated by means of a solvent, either by extraction or by crystallization, the preferred solvents being benzene, toluene, xylene or a chlorinated aliphatic hydrocarbon solvent that has a boiling point less than about 130 degrees centigrade and an ability to dissolve at room temperature at least about thirty times as much of the impurities contained in the crude 2,2-(4,4'-dihydroxydiphenyl)propane as of 2,2-(4,4'-dihydroxydiphenyl)propane itself.

It was further shown in these co-pending applications that recycling of this resinous by-product mixture to the reaction mixture suppresses their formation and stabilizes the concentration of these by-products in the system at a certain level, at which level substantially no further formation of additional resinous by-products takes place, resulting in a substantially higher yield of 2,2-(4,4'-dihydroxydiphenyl)propane.

This procedure of utilizing the by-products, however, is not without some disadvantages. Although the quantity of resin circulating through the reaction and purification stages of the process remains constant, so that no resin is taken out of the process, the concentration of resin in the mixture is higher than if no resin were recycled. Accordingly, more phenol is required to make the resin soluble in the reaction mixture, a larger quantity of phenol has thus to be distilled off, increasing the load on the distillation system, a larger quantity of solvent is required to extract the larger quantity of resin and this larger quantity of solvent has to be reclaimed, increasing the load on the solvent recovery unit.

The object of the present invention is to produce bisphenol-A of a very high degree of purity. A further object of the invention is to provide a simple economical method of purifying crude bisphenol-A containing impurities formed as by-products of the reaction. Another object of the invention is to provide a process for the production of bisphenol-A having a very high degree of purity at a yield essentially the same as that obtained in producing a crude product containing a considerable percentage of impurities. Another object of this invention is the utilization of the resinous by-products, formed in the production of 2,2-(4,4'-dihydroxydiphenyl)propane according to the processes described in the said copending applications by converting them into 2,2-(4,4'-dihydroxydiphenyl)propane. Another purpose is to facilitate the process according to the applications above by avoiding the necessity of recycling the resinous substances. Another purpose is the production of 2,2-(4,4'-dihydroxydiphenyl)propane from a novel starting material. Other objects of the invention will become apparent in the course of the description.

It was now found that the above-mentioned disadvantages can be overcome and desired objects achieved by the method of the present invention.

The invention is based on the discovery that the resinous by-products in the presence of phenol and acidic agents are converted to 2,2-(4,4'-dihydroxydiphenyl)propane. According to this invention, the resin by-product recovered by separation from the extracting agent is mixed with phenol and the mixture is contacted with an acidic agent, preferably hydrogen chloride, and kept between about room temperature and about 150 degrees centigrade, preferably between about 40 and about 80 degrees centigrade. It has been found that the resin is converted rapidly to 2,2-(4,4'-dihydroxydiphenyl)propane under these conditions.

We have found that the co-dimer converts to the o,o'- and o,p'-isomers more readily at temperatures in the upper end of the stated temperature range, than it does at the lower end thereof. However, we have found further that the o,o'- and the o,p'-isomers convert to the p,p'-isomer more readily at lower temperatures within the temperature range, i.e., they convert with relative ease at temperatures between about 40 degrees centigrade and 80 degrees centigrade, to the desired p,p'-isomer.

Thus, during prolonged continuous operation with a recycle of resinous by-products as described in our co-pending application S.N. 791,281, it has been found that the co-dimer content in the resin increases. However, when operating in accordance with the preferred processes of this invention the co-dimer content is kept at a minimum by converting it at elevated temperatures to the o,o'- and the o,p'-isomers and then converting the o,o'-isomer and the o,p'-isomer to the desired p,p'-isomer.

The latter may be recovered by the usual procedures. One method of recovery, for instance, is to filter the crystals of bisphenol and phenol, wash them free of mother liquor and separate them from the phenol. Another way is to distill under vacuum all lower boiling constituents, and to purify the residue by distillation, crystallization or otherwise.

Our preferred method of recovering the bisphenol is to add the reaction mixture, after the reaction is essentially completed, without separating it into its constituents, to a reaction mixture of phenol and acetone made for the purpose of producing 2,2-(4,4'-dihydroxydiphenyl)propane. In our preferred embodiment of this invention for the continuous production of bisphenol-A, the resin coming from the recovery of the solvent is continuously passed through one or more reactors, where it is mixed with phenol and hydrogen chloride and from there it is recycled into the reactor in which the reaction between phenol and acetone takes place.

The weight ratio of phenol to resinous by-product employed may be from about 0.5:1 to about 20:1 with a range of from about 2:1 to about 8:1 being preferred. It appears that at phenol to resin ratios below about 0.5:1 the reaction is incomplete, and at phenol to resin ratios above about 20:1 the reaction medium becomes unnecessarily diluted.

The temperature of the reaction should be maintained between about room temperature and about 150 degrees centigrade. At temperatures below room temperature the reaction is slow and at temperatures above 150 degrees centigrade side reactions take place.

Although it is preferred to use gaseous hydrogen chloride as the acidic catalyst for the conversion of the resin, other suitable acidic reagents can also be used, such as the strongly acidic materials, phosphoric acid, sulfuric acid, boron trifluoride, etc.

We have found that the reaction of the resinous materials with the phenol in the presence of an acidic reagent to form bisphenol-A, for a continuous operation, is best carried out in two agitated reactors in series. This permits time for the reaction to proceed and at the same time allows for additional material to be treated. However, one or three or more reactors may be used where desired. We have found that reacting the resin separately from the main stream of reactants where acetone is also present, permits the formation of a greater amount of bisphenol-A for every unit of resin recycled and a lower level of resin present in the reaction product main stream, than was realizable from recycling the resin directly to the main reaction.

The resin can be treated with phenol and an acidic reagent in the presence of a solvent such as water or benzene, but this is not essential to the reaction, nor is it preferred.

In this investigation and in the present specification the purity of a bisphenol product is expressed and defined by two criteria, namely, freezing point and color. The freezing point was taken in the usual manner in a one inch test tube surrounded by an insulating jacket, using a thermometer divided into tenths of a degree, calibrated against an instrument normalized by the Bureau of Standards with stem correction applied. The color was characterized by measuring in a one-half inch cell of a "Spectronic 20" colorimeter, manufactured by Bausch and Lomb, the relative transparency of a 50 percent solution of the bisphenol in ethyl alcohol to light of 350 millimicron wave length.

The following examples are given to further illustrate our invention but they are not to be construed as limiting. Where ratios are given, it is to be understood they are by weight unless otherwise stated.

*Example 1*

This example serves to show the effect of distillation upon crude bisphenol-A. A sample of crude commercial bisphenol-A in flake form, having a freezing point of 153.9 degrees centigrade and a relative transparency of 28 percent was distilled with the shortest possible holding time under a vacuum of less than one millimeter in glass equipment. The distillate had a freezing point of 155.1 degrees centigrade and a relative transparency of 39 percent.

This example shows that distillation removes a considerable portion of the impurities but does not remove all of them. The reasons are probably two-fold: Firstly, some of the impurities present in the crude bisphenol, especially the o,p'-isomer and co-dimer, have a boiling point close to that of the p,p'-isomer, so that a simple distillation does not separate them. Secondly, in the process of distillation, regardless of the precautions taken, colored decomposition products are formed.

According to the processes described in our co-pending applications, bisphenol-A further improved in purity can be obtained by a combination of distillation steps followed by an extraction or crystallization step using defined solvents. The solvents filtered from the extracted or crystallized material contain in solution the resinous by-product impurities removed from the crude bisphenol. These impurities can be isolated and recovered in concentrated form by several methods, such as crystallization, precipitation and others. We prefer to effect their separation by distillation.

*Example 2*

One thousand, one hundred and ten grams of crude bisphenol-A, made from the condensation of phenol with acetone in the presence of HCl as a catalyst, and having a freezing point of 154.0 degrees centigrade, were extracted with 1500 grams of benzene, filtered, washed with 200 grams of benzene, extracted again with 1500 grams of benzene, filtered, washed with 200 grams of benzene and dried. One thousand and twenty-eight grams of product having a freezing point of 157.0 degrees centigrade were obtained. The combined benzene solution was evaporated and left a residue of 70 grams of resinous material. The quantity of bisphenol in the residue was too small for detection.

As this example shows, the removal of the impurities by extraction may result in a loss of weight of 10 to 15 percent or more of the impure product, depending upon the percentage of impurities originally present. This weight loss might make the process economically unattractive, if it were not for the entirely unexpected observation disclosed in our co-pending application S.N. 791,281, which also forms part of this invention:

It was observed that, if the impurities extracted from one batch of bisphenol are added to the ingredients of the next batch, the quantity of the impurities present in the product of that batch is about the same as that present in the product of the batch to which no impurities had been added. This surprising observation may be explained by assuming that either the impurities normally formed in the reaction are in equilibrium with bisphenol, and if they are added beforehand to the extent that they would be formed in this equilibrium, prevent the formation of new impurities, or by assuming that the impurities are of such a nature that in contact with phenol and/or ketone, and acid, they react with either the one or the other or both to form bisphenol. Still other explanations are possible, but we do not want to be limited in any way by any explanations of this phenomenon. For the present invention, it is sufficient to state that the addition of the impurities recovered from the solvent to a production batch results practically in preventing an increase in the quantity of impurities and thereby results in an unexpectedly high yield of bisphenol. In case the process is carried out continuously as we prefer to carry out our process, the impurities coming out of the solvent recovery still would, of course, be added continuously to the other ingredients being fed continuously into the reactor.

*Example 3*

In order to ascertain that even upon repeated recycling of the impurities no accumulation of them occurs, a series of experiments was run in which each following batch was made up from all the recovered phenol in the previous batch with the addition of enough fresh phenol to react with the acetone, and with the addition of all impurities recovered from the crude product of the previous batch by extraction.

Each batch was made as follows:

| | Grams |
|---|---|
| Phenol | 2905 |
| Acetone | 290 |
| 37 percent HCl | 200 | and whatever resin was isolated from the previous batch were weighed into a three necked flask provided with an agitator, gas inlet and outlet, and kept in a water bath at 50 degrees centigrade. Gaseous hydrogen chloride was passed over the surface for 16 hours. Hydrogen chloride, water and excess phenol were removed by distillation under vacuum. Approximately 1220 grams of crude bisphenol having a freezing point of 154.4 degrees centigrade were obtained. The resinous impurities were isolated by extraction with benzene, and were recovered after vaporization of the solvent. The quantities of impurities obtained in six consecutive experiments are given in Table I.

TABLE I

| Experiment No. | Resin in: Grams | Resin out: Grams |
|---|---|---|
| 1 | 110 | 123 |
| 2 | 123 | 83 |
| 3 | 83 | 174 |
| 4 | 168 | 70 |
| 5 | 70 | 73 |
| 6 | 73 | 60 |
| | 627 | [1] 583 |

[1] Diff.—44 grams.

This experiment shows, that in a series of six consecutive runs, no new resin was formed.

Examples 4–8 illustrate our further finding that the resinous by-products boiling close to bisphenol-A, in the presence of phenol and acidic agents, are converted to 2,2-(4,4'-dihydroxydiphenyl)propane.

*Example 4*

By-product resin (45.6 grams), from which no 2,2-(4,4'-dihydroxydiphenyl)propane could be removed by crystallization from benzene, was mixed with 56.4 grams of phenol and 23.2 grams of 42 percent aqueous HCl. They were held at room temperature for a week. The HCl, water and phenol were removed by distillation. The residue was distilled under vacuum and the distillate extracted with benzene, yielding 15 grams of crystalline 2,2-(4,4'-dihydroxydiphenyl)propane.

*Example 5*

By-product resin (106 grams) and 293 grams of phenol were agitated at 50 degrees centigrade under an atmosphere of HCl gas. At the end of 16 hours, the excess phenol (270 grams), and HCl were removed by vacuum distillation and the residue was extracted with benzene.

2,2-(4,4'-dihydroxydiphenyl)propane in the amount of 78 grams were recovered. By evaporation of the benzene from the remaining solution, 38 grams of resin were recovered.

*Example 6*

By-product resin (200 grams) was mixed with 600 grams of phenol and kept at 50 degrees centigrade for 16 hours, with agitation, and HCl gas passing through the reactor. The HCl and 551 grams of phenol were removed by vacuum distillation. The residue was extracted with benzene and yielded 195 grams of 2,2-(4,4'-dihydroxydiphenyl)propane, F.P. 156.2 degrees centigrade.

*Example 7*

By-product resin (100 grams), from which no 2,2-(4,4'-dihydroxydiphenyl)propane was recoverable by benzene treatment, and 300 grams of phenol were mixed with 100 ml. of 50 percent sulfuric acid and the mixture was agitated for 48 hours at 50 degrees centigrade. After removal of the acid by washing with water and removal of the phenol by distillation, the residue was extracted with benzene. There were obtained 16 grams of 2,2-(4,4'-dihydroxydiphenyl)propane.

*Example 8*

The by-product resin used in Example 7 (100 grams), and 300 grams of phenol were mixed with 100 ml. of 85 percent phosphoric acid and agitated for 24 hours at 50 degrees centigrade. After treatment as in Example 7, 30 grams of 2,2-(4,4'-dihydroxydiphenyl)propane were recovered.

Example 9 shows our preferred method of preparing bisphenol-A of unusually high purity by the process of this invention.

*Example 9*

To illustrate the change in composition of the resinous by-product material which occurs in successive recycling operations a series of reactions was run, in which the unreacted phenol and the separated resinous by-product mixture were recycled repeatedly to the next succeeding batch. The charge for each batch was:

| | Grams |
|---|---|
| Phenol | 2900 |
| Acetone, plus | 290 | whatever resin was obtained from the previous batch. The reactions were run at 50 degrees centigrade with gaseous HCl passing over the surface of the reaction mixture for 16 hours, with agitation. At the end of this period of time approximately 300 grams of water were added and the azeotrope of $H_2O$-HCl-phenol was removed by vacuum distillation followed by a further distillation to recover the rest of the phenol. The crude product was then distilled under vacuum of less than 5 mm. and extracted with benzene to remove the resinous by-product material. Table II shows the quantity of resin obtained from each cycle and its composition. Except for less than one gram of sample used for analysis, all the resin was recycled to the next succeeding batch; none was added to the first run.

series, since its concentration in the resinous by-product material tends to increase in each succeeding run.

*Example 10*

This experiment illustrates the conversion of the co-dimer such as that resulting from the processes of Examples 3 and 9, to the o,o'- and o,p'-isomers at elevated temperatures. Co-dimer (59 grams) and phenol (159 grams) were kept on a steam bath (about 100 degrees centigrade) for 24 hours with gaseous HCl bubbling through the mixture. The excess phenol was distilled out under vacuum and 5 grams of residue were obtained, which had the composition:

| | Mol, percent |
|---|---|
| o-o'-Isomer | 2.8 |
| Co-dimer | 39.6 |
| o-p'-Isomer | 57.6 |
| p-p'-Isomer | 0 |

*Example 11*

A resinous mixture (50 grams) having the composition:

| | Mol, percent |
|---|---|
| o-o'-Isomer | 3.5 |
| Co-dimer | 36.0 |
| o-p'-Isomer | 37.0 |
| p-p'-Isomer | 23.5 | and 150 grams of phenol were agitated at 50 degrees centigrade with gaseous HCl passing through the reactor, for 24 hours. After removal of the excess phenol, the residue had the following composition:

| | Mol, percent |
|---|---|
| Phenol | 6.67 |
| o-o'-Isomer | 3.39 |
| Co-dimer | 32.98 |
| o-p'-Isomer | 11.89 |
| p-p'-Isomer | 45.07 |

*Example 12*

Eighty parts/time of phenol, 8 parts/time acetone and 1.2 parts/time of recycled by-product resin, recovered by separation of the by-product resin from the bisphenol product and further reaction of by-product resin with phenol in the presence of HCl, are continuously saturated with 2.2 parts/time of gaseous hydrogen chloride and are continuously fed to the first of three jacketed agitated reactors arranged in series and kept at 50 degrees centigrade. To the reacted material, leaving the third reactor, 130 parts/time of phenol are continuously added with agitation. The mixture is fed to the top of a column, in which essentially all hydrogen chloride, all water and part of the phenol are driven off under vacuum and recovered in a condenser, followed by a scrubbing tower for the absorption of the hydrogen chloride in weak hydrochloric acid. The mixture coming from the bottom of the column is fed through two vacuum colums in series, the first of which continuously distills and recovers the remaining phenol, while the second continuously distills the bisphenol-A and close-boiling impurities, as is disclosed in our pending application S.N. 220,617.

TABLE II

| Run No. | 1 | 2 | 3 | 4 | 5 | 6 | 7 | 8 | 9 |
|---|---|---|---|---|---|---|---|---|---|
| Gram resin obtained | 127 | 105 | 145 | 79 | 102 | 104 | 103 | 99 | 84 |
| Composition of resin, mol percent: | | | | | | | | | |
| Phenol | | | 18.1 | | 8.6 | 5.6 | 6.3 | 5.7 | 5.3 |
| o-o'-Isomer | | 5.2 | 1.2 | | 0.8 | 0.8 | 1.6 | 1.8 | 1.3 |
| Co-dimer | 29.1 | 27.1 | 42.2 | | 50.6 | 56.8 | 53.2 | 57.5 | 62.5 |
| o-p'-Isomer | 40.5 | 35.3 | 18.3 | | 22.9 | 24.3 | 24.5 | 21.9 | 20.5 |
| p-p'-Isomer | 30.4 | 32.4 | 19.8 | | 17.0 | 12.2 | 14.0 | 12.6 | 10.1 |
| Other | | | 0.4 | | 0.1 | 0.2 | 0.4 | 0.4 | 0.3 |

Inspection of the Table II indicates that the co-dimer is appreciably less reactive under the conditions of this A tarry residue is continuously discharged from the bottom of the last column.

The distillate is continuously fed into a trough in which an internally cooled cylinder is rotating. A layer of crude bisphenol-A, having a freezing point of about 156 degrees centigrade, builds up to a thickness of about one-half inch. It is continuously removed by a blade, fed into a grinder, where it is reduced to a size passing through a 10 mesh screen, and fed continuously to a separation zone for the removal of resinous by-product boiling close to bisphenol-A.

As described in co-pending applications S.N. 791,281 and S.N. 176,923, the separation can be accomplished by extraction. Here the material is continuously extracted by means of about 50 parts/time of benzene.

As described in co-pending application Serial No. 177,078, filed March 2, 1962, the separation of the by-product resin can also be accomplished by crystallization. Under the special conditions of crystallization, defined therein the material is preferably crystallized by means of about 50 parts/time of benzene.

The separated bisphenol-A is centrifuged and dried in vacuum. Thirty parts/time of bisphenol-A having a freezing point of 156.8+ degrees centigrade and a light transmittance as defined above of 75+ percent, are obtained.

The benzene containing the extracted impurities is recovered by a continuous atmospheric distillation, leaving about 1.2 parts/time of by-products resin to be treated in accordance with the improvement of this invention and recycled to the reactors.

The 1.2 parts/time of by-product resin are fed into the first of two agitated reactors arranged in series where about 3.6 parts/time of phenol and about 0.1 part/time of HCl are added, and maintained at a temperature of between about 40 and about 150 degrees centigrade until reaction has essentially ceased. The reacted by-product material is then discharged, recycled, and charged, along with the phenol and acetone feed materials, into the said first of three agitated reactors recited at the beginning of the example.

It is to be understood that the invention is not limited to the specific examples which have been offered merely as illustrative, and that modifications may be made within the scope of the appended claims without departing from the spirit of the invention.

What is claimed is:

1. The process which includes the steps of (1) reacting phenol and acetone in the presence of an acidic condensing agent to produce a reaction product comprising 2,2-(4,4' - dihydroxydiphenyl)propane, (2) distilling the more volatile materials from the 2,2-(4,4'-dihydroxydiphenyl)propane, (3) vacuum distilling the resulting 2,2-(4,4'-dihydroxydiphenyl)propane from materials less volatile in it, to obtain a distillate of 2,2-(4,4'-dihydroxydiphenyl)propane and a resinous by-product material, (4) separating the said resinous by-product material from the distilled 2,2-(4,4'-dihydroxydiphenyl)propane by means of a solvent selected from the group consisting of benzene, toluene, xylene, methylene chloride, ethylene dichloride, and trichloroethylene, whereby substantially pure 2,2-(4,4'-dihydroxydiphenyl)propane and a solvent solution of resinous by-product material are produced, (5) removing substantially all the solvent from the said resinous by-product material (6) separately treating the resultant resinous by-product material with phenol in the presence of an acidic condensing agent at an elevated temperature between about room temperature to about 150 degrees centigrade to produce a reaction product comprising additional 2,2-(4,4'-dihydroxydiphenyl)propane, and (7) recovering the 2,2-(4,4'-dihydroxydiphenyl)propane produced in step (6).

2. The process according to claim 1 wherein the acidic condensing agent is hydrogen chloride.

3. The process according to claim 1 wherein the resinous by-product material is separated from the distilled 2,2-(4,4'-dihydroxydiphenyl)propane by solvent extraction.

4. The process according to claim 1 wherein the resinous by-product material is separated from the distilled 2,2-(4,4' - dihydroxydiphenyl)propane by crystallization from a solvent medium.

5. The process according to claim 1 wherein the solvent is removed from the resinous by-product material by distillation.

6. The process according to claim 1 wherein the 2,2-(4,4'-dihydroxydiphenyl)propane obtained in step (6) is recovered by recycling the said reaction product of step (6) to step (1).

References Cited by the Examiner

UNITED STATES PATENTS

| | | | |
|---|---|---|---|
| 2,791,616 | 5/1957 | Luten | 260—619 |
| 3,073,868 | 1/1963 | Prahl et al. | 260—619 |

LEON ZITVER, *Primary Examiner.*

H. G. MOORE, *Examiner.*

J. E. EVANS, *Assistant Examiner.*